(12) United States Patent
Couleaud et al.

(10) Patent No.: US 12,301,891 B1
(45) Date of Patent: May 13, 2025

(54) GROUND-BASED CONTROLLER FOR SELECTIVELY CURATING CONTENT PROVIDED BY IN-FLIGHT ENTERTAINMENT SYSTEMS

(71) Applicant: Thales Avionics, Inc., Irvine, CA (US)

(72) Inventors: Jean-Yves Couleaud, Mission Viejo, CA (US); Tracy Decuir, Yorba Linda, CA (US); Jerry Thomas, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 267 days.

(21) Appl. No.: 16/377,701

(22) Filed: Apr. 8, 2019

Related U.S. Application Data

(60) Provisional application No. 62/655,558, filed on Apr. 10, 2018, provisional application No. 62/654,930, filed on Apr. 9, 2018.

(51) Int. Cl.
  *H04N 21/214* (2011.01)
  *H04N 21/258* (2011.01)
  *H04N 21/2668* (2011.01)

(52) U.S. Cl.
  CPC ... *H04N 21/2146* (2013.01); *H04N 21/25891* (2013.01); *H04N 21/2668* (2013.01)

(58) Field of Classification Search
  CPC .......... H04N 21/2146; H04N 21/2668; H04N 21/25891
  See application file for complete search history.

(56) References Cited

U.S. PATENT DOCUMENTS

| | | | | |
|---|---|---|---|---|
| 7,996,422 | B2* | 8/2011 | Shahraray | G11B 27/034 |
| | | | | 707/770 |
| 2009/0094635 | A1* | 4/2009 | Aslin | H04N 21/812 |
| | | | | 725/32 |
| 2010/0023964 | A1* | 1/2010 | Basso | G06Q 30/02 |
| | | | | 725/32 |
| 2011/0314502 | A1* | 12/2011 | Levy | H04N 21/4532 |
| | | | | 725/46 |
| 2013/0254802 | A1* | 9/2013 | Lax | G06Q 30/02 |
| | | | | 725/34 |
| 2017/0178253 | A1* | 6/2017 | Koufogiannakis | G06Q 50/01 |
| 2017/0308928 | A1* | 10/2017 | Weston | H04L 67/20 |
| 2019/0289336 | A1* | 9/2019 | Finkhelstein | H04N 21/2146 |

* cited by examiner

*Primary Examiner* — Oschta I Montoya
(74) *Attorney, Agent, or Firm* — Sage Patent Group

(57) ABSTRACT

A ground-based content controller for managing content provided by an in-flight entertainment ("IFE") system operating on an airplane can include a ground-based content processor and a non-transitory computer readable medium. The non-transitory computer readable medium can be communicatively coupled to the ground-based content controller and store program code executable by the ground-based content processor to perform operations. The operations can include retrieving information associated with a passenger of the airplane. The operations can further include determining content targeting rules based on the information. The content targeting rules can be used to select content to be made available to the passenger on the airplane. The operations can further include transmitting, prior to takeoff, the content targeting rules via a radio access network to an on-board content controller on the airplane.

23 Claims, 9 Drawing Sheets

```
{
    "result": {
        "predicates": {
            "$premiumOffers": {
                "type is offer",
                "id in [\"offer_sin_hotel_premium\", \"offer_sin_verokai_vip\", \"offer_sin_mifi\"]"
            }
        },
        "logic": "$premiumOffers"
    },
    "_tag": "DEMO_ONLY_DATA",
    "name": "demo2_business_1",
    "rule": {
        "predicates": {
            "$arrivingAbroad": {
                "context.is_final_destination is true",
                "context.flight.to is SIN",
                "profile.city_of_residence nin ${context.flight.to}"
            },
            "$businessClass": {
                "context.class is business"
            }
        },
        "logic": "$arrivingAbroad AND $businessClass"
    },
    "label": "Singapore Arrival Business",
    "_timestamp": 1505480159847,
    "airline-id": "1"
}
```

FIG. 11

GROUND-BASED CONTROLLER FOR SELECTIVELY CURATING CONTENT PROVIDED BY IN-FLIGHT ENTERTAINMENT SYSTEMS

CROSS REFERENCE TO RELATED APPLICATIONS

This application claims priority to U.S. Prov. App. No. 62/654,930 filed Apr. 9, 2018 and U.S. Prov. App. No. 62/655,558 filed Apr. 10, 2018, the disclosure and content of which are incorporated by reference herein in their entirety.

TECHNICAL FIELD

Embodiments described herein relate generally to electronic entertainment systems and, more particularly to a ground-based controller for selectively curating content provided by an aircraft in-flight entertainment system.

BACKGROUND

In-flight entertainment ("IFE") systems are deployed on-board aircraft to provide entertainment for passengers in a passenger cabin. IFE systems can provide passengers with television, movies, games, audio entertainment programming, and other electronic content. The airline industry has moved from a server centric architecture to a "seat centric" architecture. In the server centric architecture, multimedia content is located on a server or a set of servers installed in an electronic bay in the airplane and played through displays installed in seats. In contrast, in a "seat centric" architecture content is located and played locally at the seat. In both architectures, the server (or server farm) can act as an injection point for content that can be later installed locally at the seat and also as a secondary source for content that may not fit in the seat unit's mass storage.

The cabin crew (e.g., flight attendants) can control and interact with the system (e.g., to start the broadcast of a safety briefing) via control panels including displays and/or optional peripherals installed in the aircraft cabin.

Wireless IFE systems can provide wireless entertainment connectivity to passenger electronic devices ("PEDs") for internet access as well as streaming entertainment (e.g., movies).

Selection of what content is to be included or maintained within an IFE system can be a difficult but important process. Passenger satisfaction with a flight experience and, ultimately, with an airline can be significantly impacted by what content is made available through an IFE system.

Content may be selected for IFE systems based on box office ratings, TV ratings, and "usage data" captured by IFE systems across a fleet of aircraft. Usage data indicates what content was used by passengers during earlier flights. Usage data can provide a relatively limited understanding of content usage, such as the number of times and duration content was viewed during various flights, and what particular content may be interesting to a particular passenger. Moreover, content within the systems is usually updated only once per month across an aircraft fleet.

IFE systems are increasingly being used to provide an expanded set of services, beyond electronic content, to passengers. Existing IFE systems are unable to curate such content and services in a sufficiently user centric manner.

SUMMARY

The following detailed description discloses various non-limiting example embodiments of the invention. The invention can be embodied in many different forms and is not to be construed as limited to the embodiments set forth herein.

Some embodiments herein describe a ground-based content controller for managing content provided by an in-flight entertainment ("IFE") system operating on an airplane. The ground-based content controller can include a ground-based content processor and a non-transitory computer readable medium. The non-transitory computer readable medium can be communicatively coupled to the ground-based content processor to cause the ground-based content controller to perform operations. The operations can include retrieving information associated with a passenger of the airplane. The operations can further include determining content targeting rules based on the information. The content targeting rules can be used to select content to be made available to the passenger on the airplane. The operations can further include transmitting, prior to takeoff, the content targeting rules via a radio access network to an on-board content controller on the airplane.

Other embodiments herein describe a method for managing content provided by an in-flight entertainment ("IFE") system operating on an airplane. The method can include retrieving information associated with a passenger of the airplane. The method can further include determining content targeting rules based on the information. The content targeting rules can be used to select content to be made available to the passenger on the airplane. The method can further include transmitting, prior to takeoff, the content targeting rules via a radio access network to an on-board content controller on the airplane.

BRIEF DESCRIPTION OF THE DRAWINGS

Other features of embodiments will be more readily understood from the following detailed description of specific embodiments thereof when read in conjunction with the accompanying drawings in which:

FIG. 11 is a diagram that illustrates example rule metal-language code relating to a recommendation proof of concept according to some embodiments.

DETAILED DESCRIPTION

Figure 1:
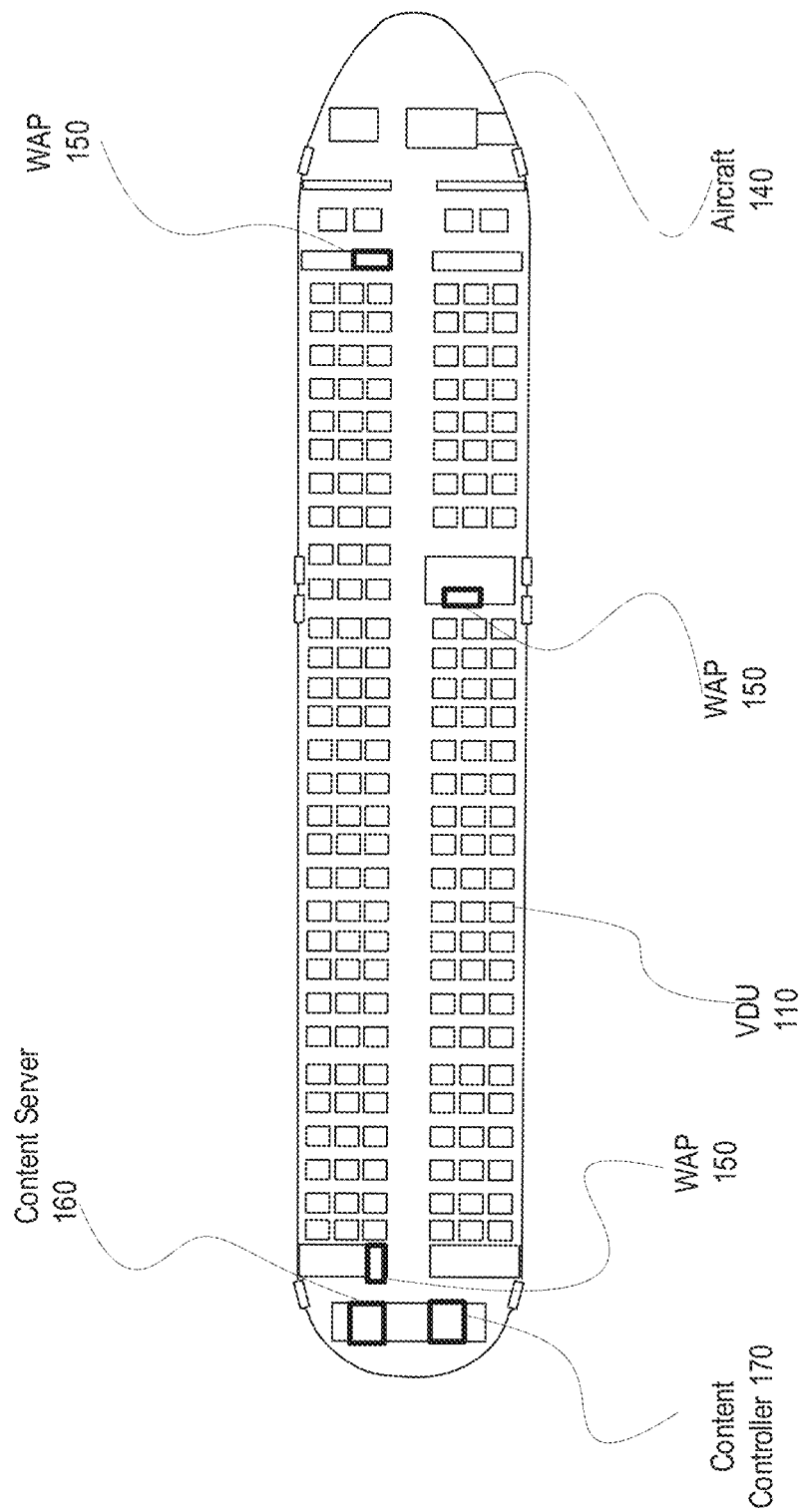
FIG. 1 is a schematic diagram that illustrates an example of an aircraft cabin with a content curation controller for controlling delivery of electronic content and services during a flight according to some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components, and circuits have not been described in detail so as not to obscure the present invention. It is intended that all embodiments disclosed herein can be implemented separately or combined in any way and/or combination.

Known IFE systems may have limited efficiency in their targeting of content to passengers, and their advertisement generation can be extremely repetitive and negatively impact the advertisers' image as well as the airline's image. Traditional systems can be prone to content aging where content becomes irrelevant over time. For example, advertising for the Olympic Games shown after their completion is a wasted advertising opportunity and may be viewed negatively by passengers. The static content repository of an IFE system in an airplane can negatively impact a passenger's experience.

Some embodiments of the present disclosure may recognize that selecting electronic content for curation to passengers based on generalized box office ratings, TV ratings, and "usage data" fails to address the substantial diversity of passenger preferences. Moreover, some embodiments recognize that selecting services to be offered to passengers based on generalized passenger surveys or feedback also fails to address the substantial diversity of passenger preferences. To overcome these and other problems, various embodiments of the present disclosure are directed to providing an IFE system that personalizes what electronic content and services are curated to a particular passenger based on a combination of information relating to the environment of a passenger and determined for the passenger through various monitoring and measurement systems associated with the IFE system. These determinations can be performed by various computer systems while the passenger is on-board and off-board the aircraft. The passenger information can be electronically determined based on what a passenger is doing or experiencing during micro-moments while planning a flight, traveling to an airport, waiting to board an aircraft, boarding an aircraft, and during defined phases of the flight. These and other embodiments are discussed in detail below.

Various embodiments disclosed herein are directed to the content distribution system that includes a ground-based content curation controller that selectively curates distributes content provided by the IFE systems that are on-board aircraft. For example, the ground-based content curation controller can select the content that will be presented on-board an aircraft. The ground-based content curation controller uses programmatic operations that select which content is made available for passenger-selection through an IFE system on an aircraft in a manner that can be targeted to individual characteristics of particular passengers on that aircraft, and which allows third parties to track and personalize which content is made available for selection by passengers.

In some further embodiments, content targeting rules are generated using the ground-based content curation controller (e.g., one or more computer servers that are communicatively connectable to the on-board IFE systems), where the content targeting rules can be used to select what and when content will be made available for consumption by a specific passenger during a flight. In some examples, the content targeting rules may control what content is transferred to which aircraft before takeoff to be available for consumption by the passenger during flight. The content targeting rules can be generated based on passenger manifests (e.g., lists) and passenger record (e.g., information on the ticket record, such as name, address, gender, age, special needs), flight schedules, journey information (e.g., city pair, time of day, current altitude . . . ) and based on content owner targeted requests.

In some further embodiments, operations are provided for authenticating a passenger so that the information from the passenger list is reconciled, such as when a passenger changes seat location.

In some further embodiments, an operational feedback loop is provided from an IFE system on the airplane that communicates back to a ground-based content curation controller, enhanced usage metrics which can include a count of how often the content has been shown to a targeted passenger, how much of the content was viewed, which advertisements were viewed, whether certain advertisements were repetitively viewed, what portions of content was skipped or not viewed. The IFE system may further communicate back to the ground-based content curation controller characteristics of passengers that have been sensed and/or identified by the IFE system.

In some further embodiments, passenger experience can be enhanced by decreasing content fatigue using operational rules that control a maximum number of content type categorization and/or content identifier that is allowed to be shown per passenger per unit of time (e.g., hours, flights, segments, trips). Operational rules may, for example, limit the number of times a particular advertisement and/or a particular type of advertisement is shown by the IFE system through a display device and/or streamed through a connected speaker to a particular passenger. These rules can be generated and modified by the ground-based content curation controller for selection of advertisements that are to be distributed to the IFE systems on airplanes, and/or to distribute rules that control selection by the IFE systems of advertisements area be displayed to passengers and/or to control timing by the IFE systems for display of advertisements.

In some further embodiments, a ground-based content curation controller and/or an IFE system can query passengers through surveys if they like or dislike the content they are being shown. Passengers' responses to such surveys can trigger operations that allow the participating passengers to skip the content pushed to them after a certain period of time. A ground-based content curation controller may operate to survey passengers before they board an aircraft and have an opportunity to interact with the IFE system, such as during a ticket reservation phase of interaction with passengers, during preflight phase while passengers are awaiting boarding of a flight, and/or during other preflight and/or post-flight time. In some examples, post-flight surveys can be used to control delivery of content on subsequent flights to those surveyed passengers.

In some further embodiments, the ground-based content curation controller is configured to analyze results of passenger surveys and the results of enhanced usage metrics, e.g., passengers' content viewing behaviors and what portions of content was skipped by passengers, to measure effectiveness of the content that is available through the IFE system.

In some further embodiments, the IFE system in combination with the ground-based content curation controller are configured to analyze enhanced usage metrics to provide an airline with capabilities that enhance their content push offer (e.g., content pushed to passengers as opposed to content selected by passengers).

In some further embodiments, the IFE system provides a graphical interface through display screens that presents all or a subset of its available display widget/elements based on rules generated and dynamically updated by the ground-based content curation controller and/or locally adjusted and/or generated based on the enhanced usage metrics and/or determined and/or sensed characteristics of the passengers.

Some further embodiments are also directed to ensuring compatibility with data privacy and data protection rules of governmental jurisdictions where the aircraft can operate. The IFE system and ground-based content curation controller may anonymize passenger characteristics, such as information relating to the Personal Identifiable Information ("PII") (e.g., passenger name and address, and information relating to passenger characteristics that is associated with the enhanced usage metrics).

Although various embodiments herein are described in relation to an in-flight entertainment system operation on an aircraft, other implementations are possible. For example, a ground-based controller can selectively distribute content to a video-entertainment system on any commercial vehicle (e.g., a boat, train, bus, or aircraft).

FIG. 1 is a schematic diagram that illustrates an example of an aircraft cabin 140 having an IFE system that includes content curation controller 170 that controls curation of content to seats in the aircraft. The IFE system can also include video display units ("VDUs") 110, wireless access points ("WAPs") 150, and a content server 160. The content server 160 can stream and/or download electronic content through wired networks (e.g., Ethernet) and/or through the WAPSs 150 to the VDUs 110 that may be mounted to structures within the aircraft, including to seatbacks, seat armrests/frames, bulkheads, overhead structures. The content server 160 may additionally stream and/or download electronic content through WAPs 150 to passenger equipment carried on-board by passengers, such as mobile phones, tablet computers, laptop computers. The content curation controller 170 can communicate with a ground-based content curation controller to determine and receive the content distributed by the content server 160.

Figure 2:
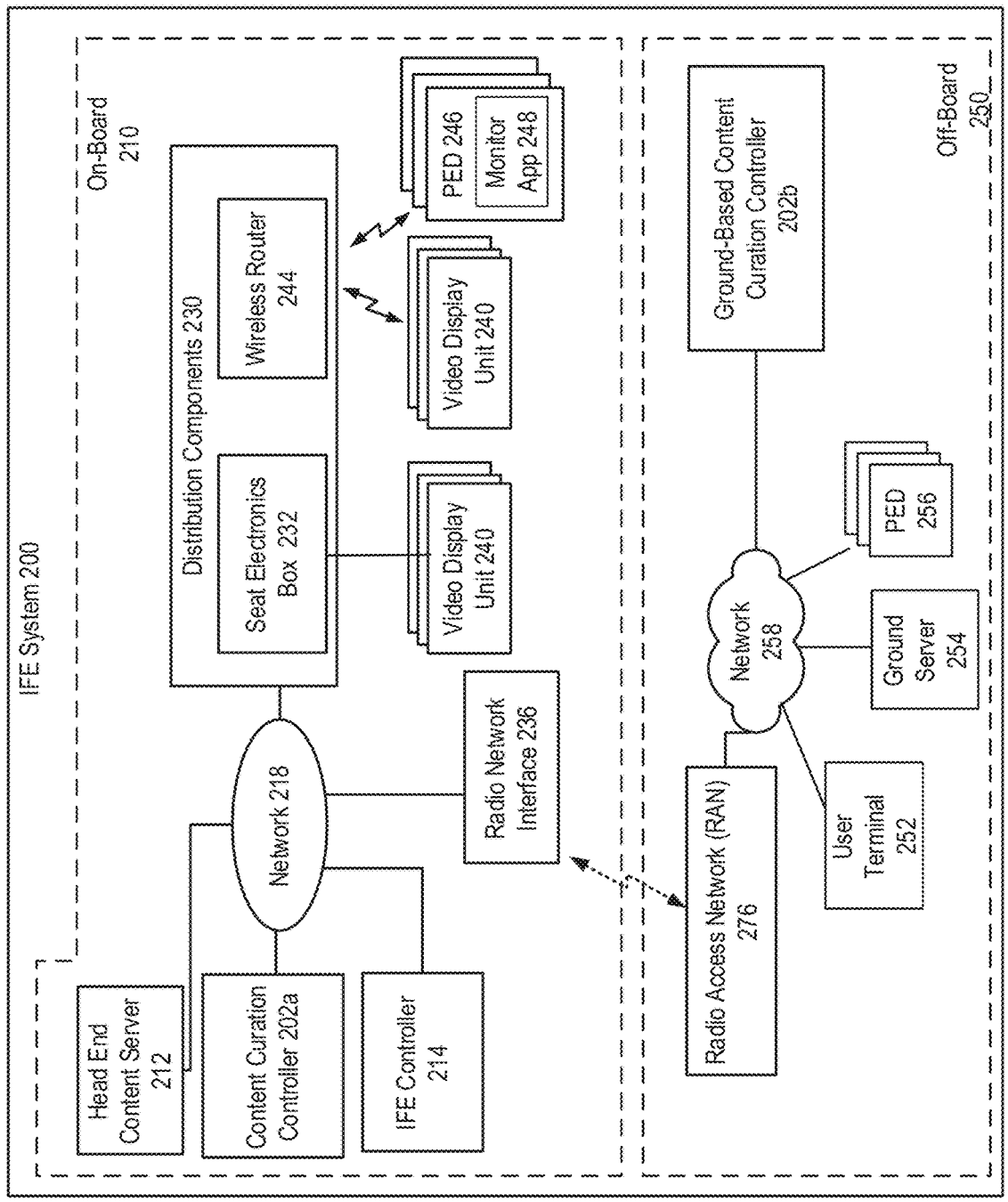
FIG. 2 is a block diagram that illustrates an example of an in-flight entertainment ("IFE") system that includes an on-board content curation controller and a ground-based content curation controller according to some embodiments of the present disclosure.

FIG. 2 is a block diagram of an IFE system 200 that includes content delivery devices, such as video display units (VDUs) 240, a head end content server 212, an onboard content curation controller 202a, an IFE controller 214, and additional content delivery devices, such as data traffic distribution components 230. The distribution components 230 communicatively connect service delivery devices, such as the VDUs 240 and passenger electronic devices ("PEDs") 246, to other components of the IFE system 200. Off-board computer systems, such as the user terminal 252, the ground-based content server 254, the ground-based content curation controller 202b, and the PED(s) 246 can communicate through a ground-based network 258 (e.g., Internet and/or private network) and one or more radio access networks (RANs) 276 with the IFE system 200 through a radio network interface 236. The RAN(s) 276 and radio network interface 236 may communicate via ground-based radio transceiver stations (e.g., cellular radio base stations) and/or via satellite-based radio transceivers. The content curation controllers 202a and 202b receive passenger information (e.g., including objective and subjective information) from the VDUs 240, the PEDs 246, the user terminal 252, and/or the server 254.

Although FIG. 2 shows a centralized on-board content curation controller 202a that controls curation of content to seats in the aircraft, some or all of the functionality disclosed herein for the on-board content curation controller 202a may be at least partially integrated within seat located components, such as within VDUs 240 located in seatbacks, seat electronics boxes, armrests, etc.

In accordance with various embodiments disclosed herein, the ground-based content curation controller 202b selects what content is distributed to the onboard content curation controller 202a. Various operations that can be performed by the ground-based content curation controller 202b to select content for distribution are explained below.

The head end content server 212 stores a set of electronic content and is configured in cooperation with the IFE controller 214 to separately and selectively deliver electronic content to a specified content delivery device, such as one or more of the VDUs 240 and/or the PEDs 246 responsive to content selection commands separately received from the VDUs 240 and/or the PEDs 246. The distribution components 230 may include additional content delivery devices, such as seat electronics boxes 232, each of which can be spaced apart adjacent to different groups of seats, and/or one or more wireless communication routers 244.

Example content that can be downloaded from the head end content server 212 can include, but is not limited to, movies, TV shows, audio programs, application programs (e.g. games, news, etc.), informational videos and/or multimedia/textual descriptions (e.g., news, advertisements, and information related to inflight services, destination cites, destination related services, and products). The wireless router 244 may be a WLAN router (e.g. IEEE 802.11, WIMAX, etc.), a cellular-based network (e.g. a pico cell radio base station), etc.

The VDUs 240 and PEDs 246 are connected to the IFE controller 214 and the head end content server 212 and operate to request and receive content through wired and/or wireless network connections through the network 218 and/or the distribution components 230. Any number of VDUs 240, PEDs 246, and content servers 212 may be used with embodiments herein. Although the onboard content curation controller 202a is illustrated in FIG. 1 as being separate from the IFE controller 214, the functionality described herein for the onboard content curation controller 110a may alternatively or additionally be performed by the IFE controller 120.

Although the system 200 of FIG. 1 includes a head end content server 212, other embodiments may not have a head end content server 212 that is separate from the VDUs 240 and/or the PEDs 246. In other words, the VDUs 240 and/or the PEDs 246 may be configured to store content in internal/local mass memory for access by users and/or may stream and/or download content from other devices, such as from other VDUs 240 and/or PEDs 246 (e.g., peer-to-peer sharing) and/or from off-board devices such as the server 254 via the RAN 276.

Figure 3:
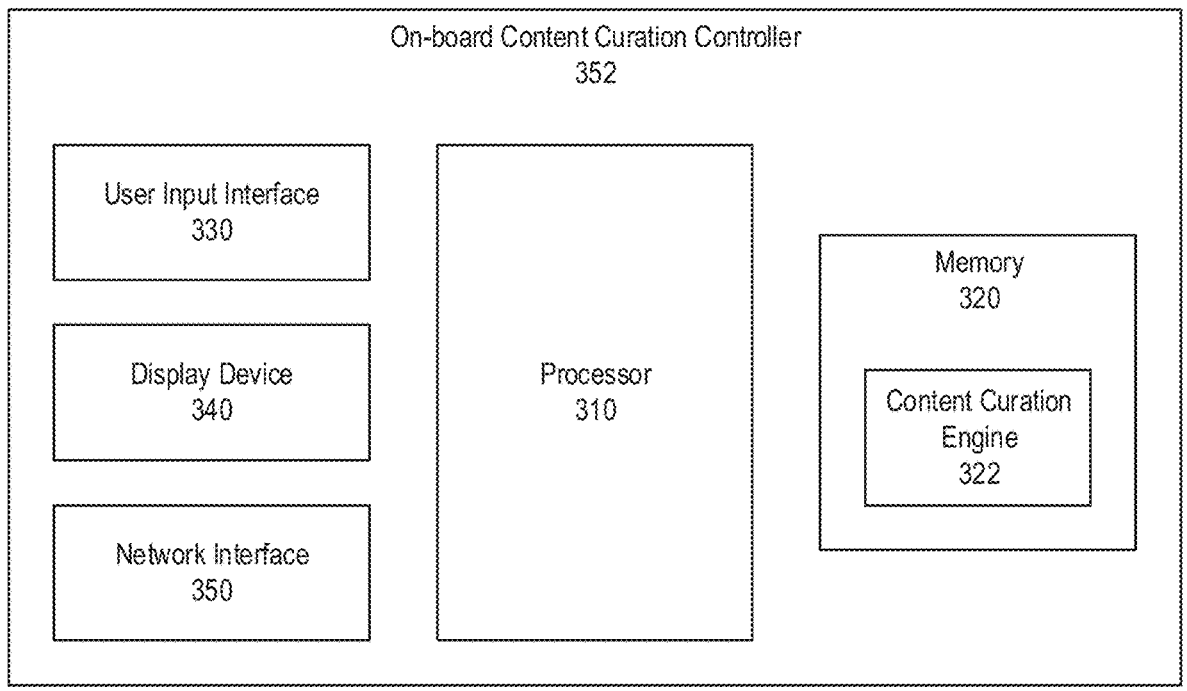
FIG. 3 is a block diagram that illustrates an example of a ground-based content curation controller according to some embodiments of the present disclosure.

FIG. 3 is a block diagram of an example of an on-board content curation controller 352 that is configured to operate according to some embodiments of the present disclosure. The on-board content curation controller 352 can be an example of the content controller 170 of FIG. 1 or content curation controller 202a of FIG. 2. The content controller 352 includes at least one processor circuit 310 (referred to as a processor for brevity), at least one memory circuit 320 (referred to as a memory for brevity), a user input interface 330, a display device 340, and a network interface 350. In some examples, the display device 340 can include a graphical display device that may include a touch sensitive display. The user input interface 330 can include a keypad, buttons, or a touch sensitive interface. The network interface 350 can include a wired (e.g., ethernet) or wireless transceiver for communicating with other devices such as sensors, content servers, VDUs, or the ground-based content curation controller 412 of FIG. 4.

The processor 310 can include one or more data processing circuits, such as a general purpose and/or special purpose processor (e.g., microprocessor and/or digital signal processor) that may be collocated or distributed across one or more networks. The processor 310 is configured to execute computer program code in the memory 320, described below as a non-transitory computer readable medium, to perform at least some of the operations described herein as being performed by an on-board content controller. For example, the on-board content controller 352 can execute content curation engine 322 stored in memory 320 to selectively distribute content in the IFE.

Figure 4:
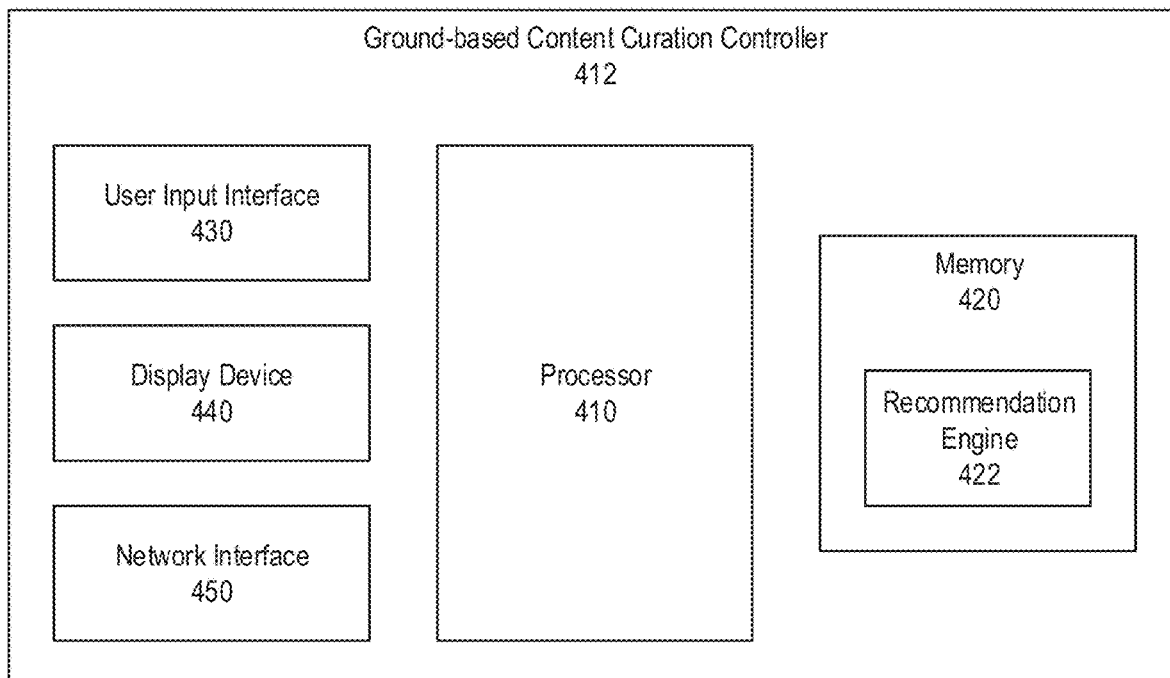
FIG. 4 is a block diagram that illustrates an example of an on-board content curation controller according to some embodiments of the present disclosure.

FIG. 4 is a block diagram of an example of a ground-based content curation controller 412 that is configured to operate according to some embodiments of the present disclosure. The ground-based content curation controller 412 can be an example of the ground-based content curation controller 202b of FIG. 2. The ground-based content controller 412 includes at least one processor circuit 410 (referred to as a processor for brevity), at least one memory circuit 420 (referred to as a memory for brevity), a user input interface 430, a display device 440, and a network interface 450. In some examples, the display device 440 can include a graphical display device that may include a touch sensitive display. The user input interface 430 can include a keypad, buttons, or a touch sensitive interface. The network interface 450 can include a wired (e.g., ethernet) or wireless transceiver for communicating with other devices such as sensors, content servers, VDUs, or the ground-based content curation controller 352 of FIG. 3.

The processor 410 can include one or more data processing circuits, such as a general purpose and/or special purpose processor (e.g., microprocessor and/or digital signal processor) that may be collocated or distributed across one or more networks. The processor 410 is configured to execute computer program code in the memory 420, described below as a non-transitory computer readable medium, to perform at least some of the operations described herein as being performed by a ground-based content controller. For example, the ground-based content controller 412 can execute a recommendation engine 422 stored in memory 420 to recommend content to be distributed to an IFE.

In some embodiments, an In-Flight Entertainment and Connectivity ("IFEC") system with a ground-based content curation controller for an airline can increase crew efficiency (e.g., via automated announcements and less requests from passengers); increase advertisement revenue; increase revenues from goods sold on-board via the IFEC system; and increase revenues from goods sold by partners via the IFEC system.

The yield of advertising in prior IFEC system is relatively low due to the poor quality of targeting and the lack of participation in automated ad platforms. On a typical long-haul fleet like the one used for this scenario, one can expect about 600 video programs watched per day. These are 600 opportunities for targeted advertisement.

An IFEC system in accordance with some embodiments can be built as a single data-centric & ground-centric system that provides content to and monitors the operation of all the seatback displays and passenger owned electronic devices connected to the IFE as a way to access passengers (to entertain but also to extend the airline relationship), and which uses onboard servers as caches or proxies for ground content until sufficient air to ground bandwidth becomes available (both technically and economically) to operate without them.

In some embodiments, a ground-based content curation controller connected to the IFEC may be built as a data-driven DevOps platform, where it is focused more on continuous improvement and operation than on development. Operations can be performed so that the ground-based content curation controller gets better over time at targeting content for passengers, through disciplined data-driven improvement (KPI, A/B testing, permanent updates).

The ground-based content curation controller may support hyper-personalization/targeting of individually identified passengers and/or groups of passengers' characteristics. It may operate to identify passengers, learn from them, and deliver to each of them a personalized content offering and delivery experience.

The IFEC system with ground-based content curation controller may be structured as a platform designed for airlines to master passenger experience: through onboard displays, the IFEC system with ground-based content curation controller allows airlines to connect their main assets—passengers—to their digital passenger experience platform and to an ecosystem of stakeholders interested in engaging them for the benefit of the airline. The system provides an additional digital touch point in the airline ecosystem, allowing each airline to extend their digital marketing and branding reach to the seatback. The system may also feed-back all it collects to the airlines or their partners to enrich their CRM or their relationship with these partners.

The IFEC system may provide wireless connectivity at the seat and be fully provisioned to support passenger electronic devices (PEDs) such as phones, tablet computers, laptop computers, smart watches, etc.

The IFEC system with ground-based content curation controller may interface with an efficient and fully automated cloud-based content delivery system, covering all parts of the content supply chain from content acquisition and licensing, to multi-tenant, geographically distributed content warehouses, to distribution, to disposition and real-time consumption analysis.

Figure 8A:
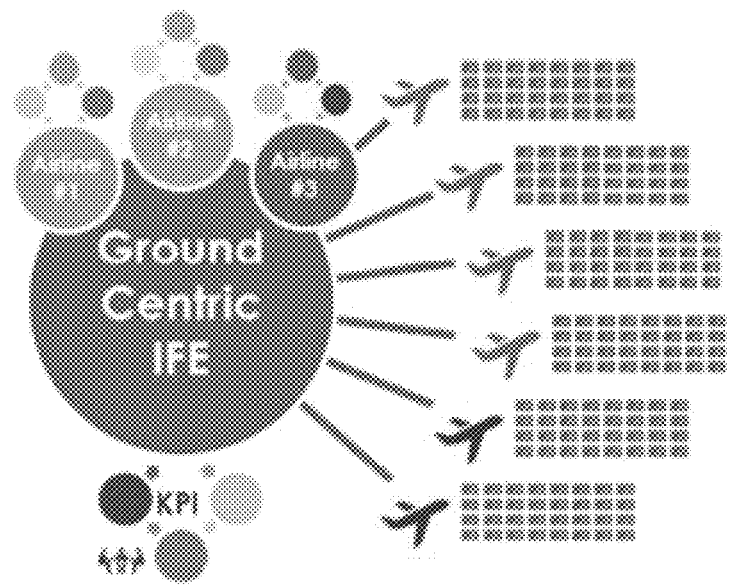
FIGS. 8A-B are diagrams that illustrates functional components of an IFEC system with a ground-based content curation controller and their functional operations and related information flow according to some embodiments.
Figure 8B:
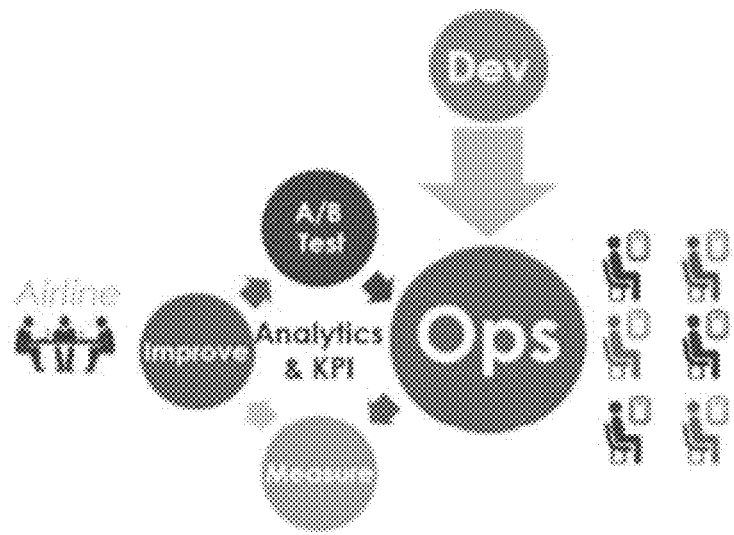

FIGS. 8A-B illustrate functional components of an IFEC system with a ground-based content curation controller and their functional operations and related information flow according to some embodiments. The ground-based content curation controller can use these functional components to collect metrics that are used to select content for distribution to the IFECs on-board airplanes.

The system with ground-based content curation controller can be designed to be integrated into a larger digital experience that airlines are building for their passengers, extending their online presence and their traditional marketing channels (in-flight magazine, company website, passenger portals, journey management mobile applications, etc.) to the seatback and their PEDs. The system capitalizes on the captive aspect of the airline passengers to not only entertain them but also serve as a new direct marketing channel for airlines, helping them push their brand and their existing partnership and generate additional revenue through better advertisement and increased and better directed transaction opportunities.

To facilitate the transition from one marketing channel to another, the system can seamlessly integrate PEDs that passengers bring onboard. Through a combination of automatic passenger name record (PNR) and CRM data ingestion and distribution via its ground segment, the system is cable of providing a friction-less identification and thus integrates IFE into the overall passenger digital journey. With native ground and flight connectivity, data produced by the IFE could also feed the airline customer data lake and data coming from other airline sources such as their Customer Relationship Management (CRM) could also feed the IFE. This also means that the totality of the value is realized when the system is authorized by contract and regulation to collect, process, and consolidate passenger data.

The system with ground-based content curation controller may operate to increase airlines advertisement revenues through hyper-personalization. The system may operationally support multiple advertisement formats in order to provide the most appropriate solution for each ad provider: banner, video, web, or even micro-sites fully integrated into the GUI. The system may operationally provide airlines full control over their marketing message with online campaign management tools similar to what they use on their other marketing channels. The system may operationally allow segmenting the audience in multiple categories, each being targeted with a specific campaign and a specific ad format. It also gives airline control over when to show ads or special offers thus reducing the risk of ad overload and increasing efficiency. Ad related KPIs such as impression count and conversion rate (for micro-sites for example) are also provided as part of the system online toolset for airlines and advertiser to assess efficiency of ad campaigns. Such approaches can drastically multiply the onboard advertisement opportunities and thus the associated revenues. By providing access to rich passenger data, multiple ad formats, impression/CPM analysis and quick digital content delivery, the system connects airlines to an ecosystem of new ad providers interested in these specific demographics and ready to pay a higher price to get access to them with specific ads.

The system with ground-based content curation controller may increase airlines ancillary revenues by applying the preceding operations to customize the purchase offerings and respond to how customers buy onboard. In some examples, by supporting contextualized promotions that could be triggered according to any marketing tactic, the system increases the efficiency of airlines ancillary revenue generation effort. In additional or alternative examples, connecting airlines with a wide variety of ground ecosystem inventories such as airport mall, internet vendors or select partners and giving them a convenient way to tailor/promote their offers, the system gives new revenue opportunities to airlines. In additional or alternative examples, by providing several user-friendly on-board payment solutions (e.g. eTicket, PED-pairing, frequent flyer miles), the system reduces payment friction and thus increases passengers' willingness to pay. In additional or alternative examples, with embedded sales data analytics, the system provides airlines with insights on buying habits of their passengers, thus allowing them to be more creative in their offer and pricing strategies.

In some embodiments, the ground-based content curation controller architecture can include three types of components: content management components that allow the airline to define what content is going to be displayed in front of each passenger; content delivery components that push the required content onboard; and communication infrastructure that support the content delivery.

A ground-based recommendation engine, within the content curation controller, defines what content should be displayed in front of each passenger based on configuration and passenger/usage/content data. It can help airlines associate content with passenger sets.

In some examples, the ground-based recommendation engine can include a smaller operational onboard recommendation engine, within the content curation controller, can operate to match the recommendation generated by the ground engine with onboard data (e.g., PNR, flight, passenger identification) and identify if passengers are part of an A/B testing campaign.

In additional or alternative examples, the ground-based recommendation engine can include a time-sensitive data exchange service that is in charge of handling the necessary data exchange between the ground and flight recommendation engine to allow personalization.

In some embodiments, a ground airline toolset is provided to each airline. It allows airlines to configure the recommendation components that will implement their marketing tactics. These configurations are defined through a marketing campaign manager that supports A/B testing and is gathering KPI to measure the efficiency of these campaigns. It also allows airlines to define/update their PAX GUI configuration.

In some embodiments, a set of plug-ins feed the ground-based content curation controller. A ground airline CRM plug-in can connect the ground-based content curation controller to airline CRM and integrate the associated data/content in the toolset. This plug-in is also able to push processed usage data into the airline CRM. A set of ground content providers/meta-data providers plug-ins can get access to their catalog of content and integrate the associated data in the toolset. This plug-in is also able to push the relevant data into content providers system—e.g. impressions for ads providers. A set of ground payment solution plug-ins can support payment made onboard with various payment technologies-credit/debit card, PayPal, frequent flyer miles, etc.

A configurable onboard passenger graphical user interface (PAX GUI) can be configured through the airline toolset, which operates to identify the user on behalf of the small onboard recommendation engine and executing the configuration defined by it. It is also the onboard front-end of the payment system. It is capturing all clickstream and relevant passenger interaction in real time for offline analysis once uploaded to the ground segment. From this, the system is able to assess efficiency of the content set or the overall passenger experience with the IFE as well as measure impressions and clicks (conversion for micro-sites) for targeted ads. This onboard PAX GUI should be able to run on seatback displays or on PED.

A ground based automated content ingestion pipeline that connects to content providers' inventory and ingests content defined through the ground-based content curation controller airline toolset and processes it so that it can be loaded and consumed by the onboard IFE. It should not only support multiple resolutions and multiple versions of the same content but also support standardized meta-data and multiple subtitles. The content ingestion pipeline is able to package large cyclic updates or smaller acyclic updates.

Two levels of ground Content Delivery Network (CDN) that are in charge of pushing content onboard, including new software release/new UI configuration and maintenance data include a cyclic CDN and an acyclic CDN. The cyclic CDN can deliver a large amount of data to the aircraft. The acyclic CDN can deliver smaller opportunistic updates with no touch able to take advantage of any aircraft down-time, including turn-around time at the gate. This CDN, in combination with the on-board system, can be smart enough to support intermediate content deliveries. For example, if there's not enough time or bandwidth for a whole acyclic update, only lower resolution content could be loaded.

The Content Delivery Network or Content Distribution Network (CDN) can be a geographically distributed network of proxy servers and their data centers. The CDN can distribute service spatially relative to end-users to provide high availability and high performance. CDN are thus connecting CDN Origin (servers that are close to data producers) to CDN Edges (servers that are close to data consumers).

A set of onboard servers can act as CDN edges. These servers could operate as proxy of the CDN. If the connectivity bandwidth was large-enough, they could even disappear or be limited streaming buffering. The servers can be in charge of delivering the content to the seatback displays or the PED. Historically our content servers were duplicated redundancy. The way the duplication is performed leads to a big waste in both storage and computing power. The IFEC system with ground-based content curation controller can use head-ends servers as a computer cluster and make a distributed storage and compute platform out of them. This would allow either more content to be installed, reduce the cost of each individual server (less storage) or reduce the number of servers.

In some embodiments, a ground connectivity platform provides an abstraction layer over the communication architecture. The ground connectivity platform can support the cyclic and acyclic CDN and the time-sensitive data exchange services. It can provide the best communication channel and support the proper level of QoS. The ground connectivity platform can integrate a Network Operation Center (NOC) and a Security Operation Center (SOC).

In some embodiments, the ground connectivity platform can operate to provide a high bandwidth gate connectivity solution to update content and data during aircraft turn-around. In additional or alternative embodiments, the ground connectivity platform can operate to provide an inflight connectivity solution to update passenger data and get associated recommendation from the ground after take-off if required and to support onboard payment or live content delivery (IP TV). In additional or alternative embodiments, the ground connectivity platform can operate to provide a ground content operation center for an IFEC and/or ground-based content curation controller manufacturer and/or airline that is monitoring core system usage data and KPI, support A/B testing and DevOps. In some examples, it may also be in charge of Over-the-Air updates of the onboard IFE and/or the predictive maintenance of the system.

Figure 9:
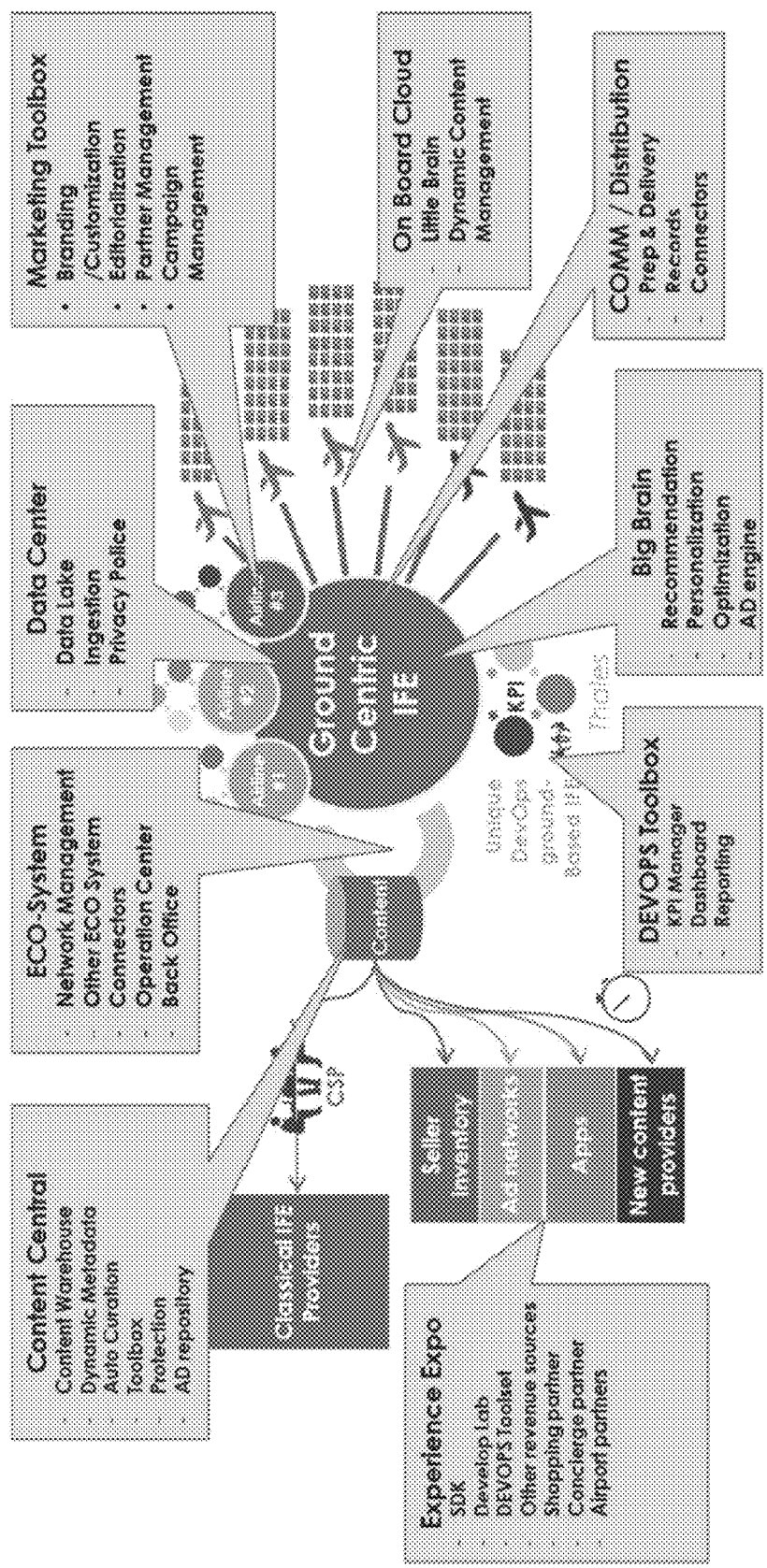
FIG. 9 is a diagram that illustrates functional components of the system including the ground-based content curation controller architecture and their respective operations and related information flow according to some embodiments.

FIG. 9 illustrates functional components of the system including the ground-based content curation controller architecture and their respective operations and related information flow according to some embodiments.

Figure 5:
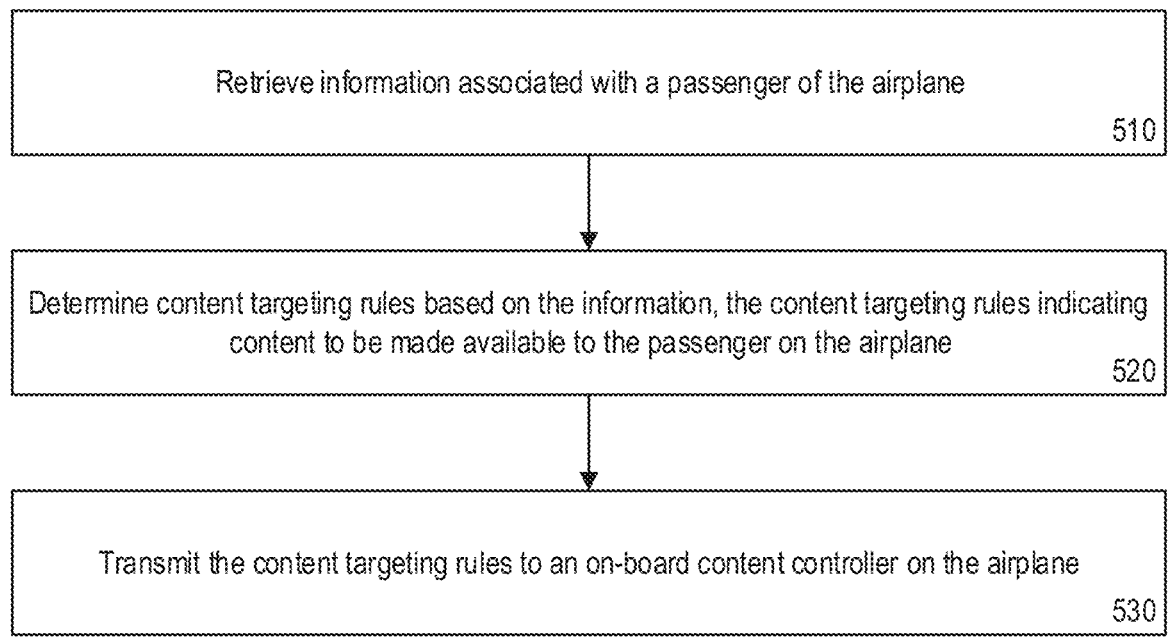
FIG. 5 is a flow diagram that illustrates an example of a process for managing content provided to an IFE operating on an airplane according to some embodiments of the present disclosure.

FIG. 5 is a flow diagram that illustrates an example of a process for managing content provided to an IFE operating on an airplane according to some embodiments of the present disclosure. The process is described below in reference to the ground-based content curation controller 412 of FIG. 4, but other implementations are possible.

At block 510, processor 410 retrieves information associated with a passenger of the airplane. In some examples, the processor 410 receives a passenger manifest for a flight shortly before takeoff. The passenger manifest can indicate the passenger is scheduled to take the flight and may include the information associated with the passenger. In additional or alternative examples, the processor 410 may use an identification of the passenger from the passenger manifest to query a database of historical data for the passenger. The historical data can include information regarding age, gender, previous flights taken, content observed on previous flights, actions taken on previous flights, and survey feedback results submitted by the passenger. In additional or alternative examples, the processor 410 may receive booking information for the passenger indicating the passenger has booked a ticket for a future flight.

At block 520, processor 410 determines content targeting rules based on the information. The content targeting rules can indicate content to be made available to the passenger on the airplane. In some examples, the content targeting rules can indicate the content (e.g., movies, TV shows, audio, in-flight buying opportunities) to be displayed to the passenger and conditions in which to push the content (e.g., to display a pop-up or make an option prominent on a display).

Figure 6:
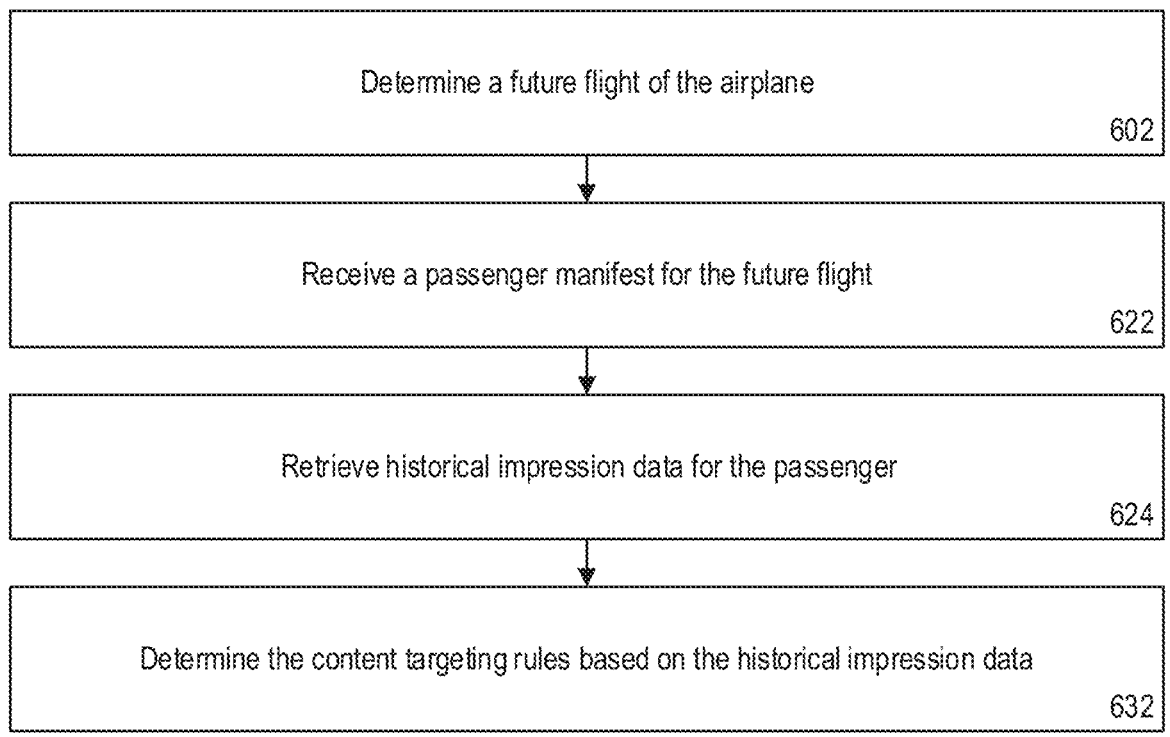
FIG. 6 is a flow diagram that illustrates an example of a process for determining content targeting rules according to some embodiments of the present disclosure.

FIG. 6 is a flow diagram that illustrates an example of a process for determining content targeting rules according to some embodiments of the present disclosure. The process is described below in reference to the ground-based content curation controller 412 of FIG. 4, but other implementations are possible.

At block 602, processor 410 determines a future flight of the airplane. In some examples, the processor 410 may determine the future flight more than twenty-four hours in advance and the processor 412 may determine the content to be loaded on the aircraft. In additional or alternative examples, processor 410 may determine the future flight shortly before takeoff.

At block 622, processor 410 receives, via network interface 450, a passenger manifest for the future flight. The passenger manifest may be received shortly before takeoff and indicate the passengers scheduled to be on-board the aircraft and the seat associated with each passenger. The passenger manifest may also indicate some information about each passenger such as name, age, gender, and boarding class.

At block 624, processor 410 retrieves historical impression data for the passenger. The processor 410 may access a database communicatively coupled to the processor 410 that stores previous content usage statistics of the passenger. The historical impression data may indicate the content previously viewed by the passenger and the context in which the content was previously viewed by the passenger.

At block 632, processor 410 determines the content targeting rules based on the historical impression data. In some examples, the content targeting rules can instruct the on-board content controller such that fresh content (e.g., content not previously viewed on an aircraft by the passenger or content not previously made available on an aircraft to the passenger) is to be displayed to the passenger. In additional or alternative examples, the content targeting rules can instruct the on-board content controller on how to modify the content presented to the passenger based on different context during the flight (e.g., a specific time during the flight or in response to the passenger using the restroom, waking up, finishing a movie, or requesting a beverage).

In some embodiments, the operations described in blocks 602, 622, 624, and 632 may be performed in another order and/or some operations may be omitted.

Returning to FIG. 5, at block 530, processor 410 transmits, via network interface 450, the content targeting rules to an on-board content controller on the airplane. In some examples, the processor 410 can also transmit content to the on-board content controller based on the content targeting rules.

In some embodiments, the operations described in blocks 510, 520, and 530 may be performed in another order and/or some operations may be omitted.

Figure 7:
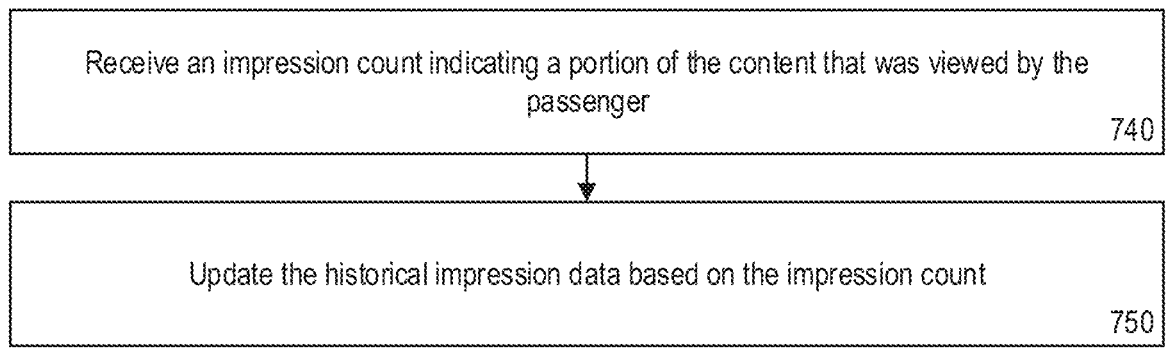
FIG. 7 is a flow diagram that illustrates an example of a process for updating historical impression data according to some embodiments of the present disclosure.

FIG. 7 is a flow diagram that illustrates an example of a process for updating historical impression data according to some embodiments of the present disclosure. The process is described below in reference to the ground-based content curation controller 412 of FIG. 4, but other implementations are possible.

At block 740, processor 410 receives, via network interface 450, an impression count indicating a portion of the content that was viewed by the passenger. In some examples, the impression count can further include an indication of when and in what context the content was viewed by the passenger.

At block 750, processor 410 updates the historical impression data based on the impression count. In some examples, the processor 410 can update an entry for the passenger in a communicatively coupled database.

In some embodiments, the operations described in blocks 740 and 750 may be performed in another order and/or some operations may be omitted.

Example Embodiments

Several dimensioning use cases are now explained to illustrate operation of a ground-based content curation controller and other components of the system according to some embodiments of the present disclosure.

In some embodiments, a passenger is not identified by the system (e.g., no login or personal data collection opt out). Personalization can be bootstrapped by asking the passenger a short series of questions regarding their interests. Based on that input and on this passenger's content consumption, the ground-based content curation controller can recommend content. At the end of the flight, all data collected on this passenger can be transmitted to the ground-based content controller and used for collaborative filtering. If the profile of this passenger becomes available after the flight (e.g., provided that they did not opt-out data collection), it can be enriched with the information collected on board. On-board profiles can be designed so personal information (e.g., name, date of birth, zip code, etc) can be converted into a profile while preventing the profile from being converted into personal information.

In an additional or alternative embodiment, a passenger has been identified by the system (e.g., based on login or PED pairing). If this passenger's data is available on-board (e.g., it has been transferred by the ground to the airplane prior to that passenger logging in), the ground-based content curation controller can operate to offer recommendations based on the information contained in the profile. Such information may include all what an anonymized PNR includes today (i.e. address zip code, country, DoB, gender, nationality, Elite level status, Number of passengers travelling on same ticket, frequent flyer program status, VIP status, Codeshare partner status, Frequent flyer number, VIP passenger lounge member status, Upgrade request indicator, Special needs) as well as history of content consumption and other content-related information such as playlists. In addition, other information such as buy-on-board history can be used to enhance marketing recommendations. This also can be used to perform A/B testing, for this the A/B testing group is also contained in each profile.

Figure 10:
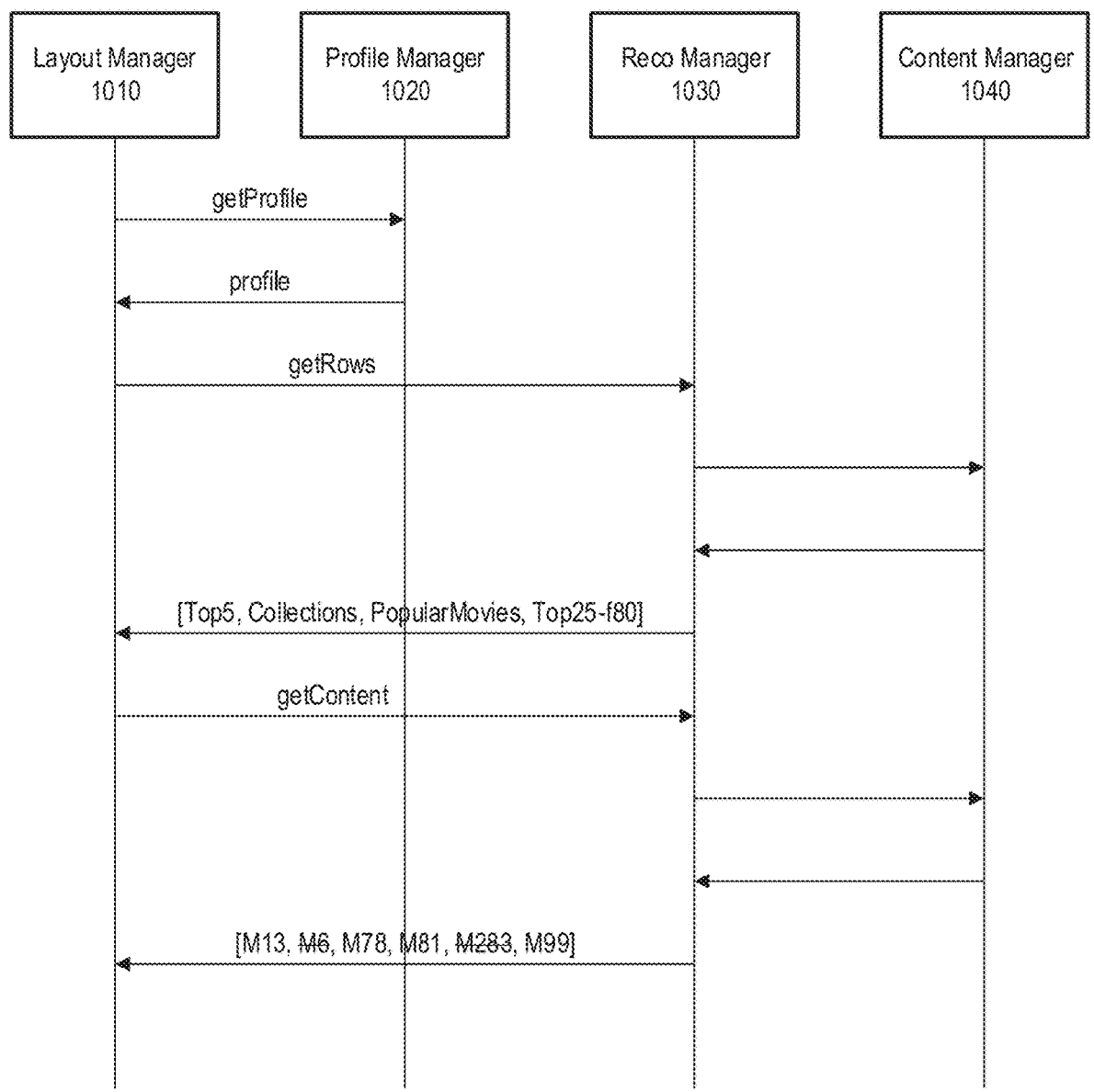
FIG. 10 is a data flow diagram illustrating the operations and related data flows that occur between functional components of the ground-based content curation controller in accordance with some embodiments.

FIG. 10 is a data flow diagram illustrating the operations and related data flows that occur between functional components of the ground-based content curation controller in accordance with some embodiments. Specifically, FIG. 10 illustrates a data flow between a layout manager 1010, a profile manager 1020, Reco Manager 1030, Content manager 1040 for creating a personalized experience. Profile information can drive a A/B testing group, layout version, and recommender version. Actual rows can be dynamically fetched based on passengerID, testGroup-ID and algorithm ID. For each row, content can be dynamically fetched. Order can be personalized to a user and already watched content can be removed.

If the passenger cannot be identified, recommendations can first start as in the previous embodiment, but the ground-based content curation controller can request passenger profile data from the ground and switch to fully personalized mode once that data is received. This request could happen at the gate or during flight using the in-flight connectivity link depending on when passengers identify themselves. The ground-based content curation controller can also use passenger's PED once paired as a data repository for profile information so that even if the profile cannot be received from the ground, adequate personalization can still be presented.

In additional or alternative embodiments, when no connectivity (at the gate and in-flight) is available, the system including the ground-based content curation controller and/or on-board IFEC can respond to usage to provide recommendations as well as data stored on passengers' PED if they elected to pair with the IFE. Data collected during flight should be kept until a proper communication channel is re-established to offload it.

In some embodiments, usage-based recommendations may be impacted if no usage similarity matrix is updated for more than 5 days. In that case, the system including the ground-based content curation controller and/or on-board IFEC can either carry on with the last loaded version of the similarity matrix or stop providing usage-based recommendation or replace it by on-board trending.

In some embodiments, data collection goes beyond what current systems do. All interactions may be captured in context. For example, if a passenger selects a movie, the system including the ground-based content curation controller logs from which recommender it was selected as well as the rank of the recommendation within that recommender. The system including the ground-based content curation controller and/or on-board IFEC may do that as an ecosystem, so the separation of what data is collected by the on-board sub-system and what is consolidated on the ground can vary depending on the selected architecture.

All failed interactions need to be captured as they are important to evaluate user's pain points. For example, trying to select a non-selectable widget, clicking/tapping outside of a selection zone, trying to fast forward a non-skippable ad, going back and forth with fast forward/rewind or a scrubber bar are all important events that need to be logged.

External context is also important. All events may be time-stamped and given aircraft context (e.g., gate, taxi, cruise, climb, descent, or location). As an ecosystem, the system including the ground-based content curation controller and/or on-board IFEC can be configured to put an interaction back in aircraft context: did the event happen during a meal service? While a PA was on? During a specific region fly-over? Shortly after take-off? Just before landing? During turbulence?

In some embodiments, a strong Content Management System is the backbone of the system including the ground-based content curation controller and/or on-board IFEC. It covers the ground features, content supply chain, metadata management, content warehousing, versioning, encoding, licensing management, packaging, and distribution as well as the on-board features including total and partial ingestion, installation, presentation, corruption management, metadata visualization.

In this use case, content is sourced from a traditional supply chain (a Content Service Provider, aka CSP). The content is licensed by the CSP to the Studio that owns it on behalf of the airline. The license is a per aircraft model, regardless of the number of times the content is actually watched. The content is provided by the CSP in a standard format including all metadata and supporting assets (e.g., posters, preview video, trailers) available in the format and posted by the CSP on the system CMS platform. As it is posted, it triggers a workflow that may check for quality automatically, reject items, and inform the CSP if the quality check fails. The content can be checked for metadata completeness and flag missing items. The missing metadata items can be automatically replaced based on information from qualified sources (e.g. IMDB pro). The CSP can be automatically informed of missing items if the process fails. Media can be sent to an encoding workflow and multiple versions of the content can be generated depending on the media they are supposed to be played on. Potentially incomplete versions can be packaged and stored securely in a content warehouse so that they can be distributed. Manual consolidation may be necessary if a complete set of metadata and supporting assets are not received in time for initial delivery. The CDN can take content from the content warehouses and distribute the content to local points of presence (edges) based on target airplanes schedules. A Data Distribution Service can bring content on-board the airplanes. On-board systems can attempt to install content and can inform a ground-based content curator controller of success or failure for each piece of content ingested. A passenger GUI may only show versions of content that have been successfully installed. Upon successful installation, the CMS can be informed that the terms of the content license are met, and adequate billing/license documents can electronically issued.

In some embodiments, content can be sourced from a non-traditional supply chain (not a CSP). The content can be licensed directly by the ground-based content curation controller and/or on-board IFEC manufacturer and/or airline to the Studio that owns it. The license can be either a per aircraft model, regardless of the number of times the content is actually seen or per impression.

The studio may directly issue the content, its metadata and supporting assets into the system CMS. In addition, the on-board system can manage impressions and issue a reliable and tamper-resistant count for every airplane every time connectivity to the ground is established.

In some embodiments, the system may not be static. The system may get updated regularly and evolve with time. The system can be architected so that each of its components can be developed and operated dynamically, in a DevOps fashion allowing greater flexibility for updates and reduced development schedules and costs. The rules of certification may not be violated, instead a platform may be designed so that it can be updated within these rules. For example, changing a recommender algorithm may not require any software update on-board if this algorithm is implemented on the ground.

In some embodiments, a passenger GUI wants to display a set of video programs for the passengers to select. The information returned by each of the managers 1010, 1020, 1030, 1040 could have been computed or extracted from data computed on the ground. In essence if one changes the way that data is computed, this directly affects the result on board, hence a way to change the on-board system behavior without changing any of its operating software.

In a rule-based recommendation engine, rules can be defined using a meta-language. FIG. 11 illustrates example rule metal-language code relating to a recommendation proof of concept. Such instructions would be interpreted at run-time by the on-board system, hence loading a new set of instructions into the system, for example as content, would also have a direct impact on the behavior of the system, once again without changing the underlying operating software.

| Acronyms | |
|---|---|
| VOD | Video-On-Demand |
| PED | Personal Electronic Device |
| VDU | Video Display Unit |
| WAP | Wireless Access Point |
| IFE | In-flight Entertainment System |
| CRM | Customer Relationship Management |
| CSP | Content Service Providers |
| GUI | Graphic User Interface |
| KPI | Key Performance Indicator |
| PAX | Passenger |

Further Embodiments and Definitions

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A ground-based content controller for managing content provided by an in-flight entertainment ("IFE") system operating on an airplane, the ground-based content controller comprising:
 a ground-based content processor; and
 a non-transitory computer readable medium communicatively coupled to the ground-based content controller and storing program code executable by the ground-based content processor to perform operations comprising:
  retrieving information associated with a passenger of the airplane;
  determining content targeting rules based on the information, the content targeting rules indicating instructions for selecting content and instructions for determining when, during a flight, to make the content available to the passenger on the airplane based on an action by a passenger during the flight;
  transmitting, prior to takeoff, the content targeting rules via a radio access network to an on-board content controller operating on the airplane,
  wherein transmitting the content targeting rules to the on-board content controller on the airplane comprises:
   determining an amount of time before takeoff;
   determining a version of the content to transmit to the IFE system prior to takeoff based on the amount of time; and
   transmitting the content targeting rules and the version of the content to the IFE system prior to takeoff.

2. The ground-based content controller of claim 1, wherein retrieving the information associated with the passenger comprises:
 determining a future flight of the airplane; and
 receiving a passenger manifest for the future flight, the passenger manifest indicating the passenger is scheduled to be on the future flight.

3. The ground-based content controller of claim 2, wherein determining the content targeting rules comprises:
 retrieving historical impression data for the passenger, the historical impression data indicating content viewed by the passenger during a previous flight; and
 determining the content targeting rules based on the historical impression data.

4. The ground-based content controller of claim 3, wherein the operations further comprise:
 receiving, after landing, an impression count indicating a portion of the content that was viewed by the passenger; and
 updating the historical impression data based on the impression count.

5. The ground-based content controller of claim 1, wherein determining the content targeting rules comprises:

determining at least one of a passenger record, flight schedule, or journey information associated with the passenger; and
 determining the content targeting rules based on the at least one of the passenger record, flight schedule, or journey information.

6. The ground-based content controller of claim 5, wherein the passenger record comprises at least one of a name, address, gender, and age, and
 wherein the journey information comprises at least one of a city pair and time of day.

7. The ground-based content controller of claim 1, wherein the operations further comprise:
 receiving targeted requests for the content that indicate an audience desired by the owner of the content; and
 determining the content targeting rules to satisfy a condition that the content meets the targeted requests.

8. The ground-based content controller of claim 1, wherein retrieving information associated with a passenger of the airplane comprises:
 providing the passenger with a survey comprising questions related to content preferences of the passenger;
 receiving, in response to providing the survey, feedback from the passenger indicating the content preferences of the passenger; and
 determining the content targeting rules based on the content preferences.

9. The ground-based content controller of claim 1, wherein transmitting the content targeting rules to the on-board content controller on the airplane comprises:
 determining whether to use a cyclic content delivery network or an acyclic content delivery network based on the amount of time and a size of the content; and
 transmitting the content to the on-board content controller on the airplane.

10. The ground-based content controller of claim 1, wherein determining the content targeting rules comprises:
 determining the content to be made available, the content including at least one of a movie, a TV show, audio, and an in-flight buying opportunity; and
 determining a trigger for causing the content to be pushed to the passenger during the flight, the trigger being based on historical usage data of the passenger and in-flight context and the trigger being determined without input from the passenger, the in-flight context comprising the action by the passenger, which is separate from an amount of time spent viewing the content and an amount of time relative to a duration of the flight.

11. The ground-based content controller of claim 1, wherein determining the content targeting rules comprises:
 determining instructions for modifying what is included in the content being made available to the passenger on the airplane based on in-flight updates of content consumption by the passenger.

12. The method of claim 1, wherein the content comprises advertisements,
 wherein determining content targeting rules comprises determining a frequency in which to display the advertisement to the passenger based on a comparison of the information associated with the passenger and a target audience associated with the advertisement.

13. A method for managing content provided by an in-flight entertainment ("IFE") system operating on an airplane, the method comprising:
 retrieving information associated with a passenger of the airplane;

determining content targeting rules based on the information, the content targeting rules indicating instructions for selecting content and instructions for determining when, during a flight, to make the content available to the passenger on the airplane based on an action by a passenger during the flight;

transmitting, prior to takeoff, the content targeting rules via a radio access network to an on-board content controller operating on the airplane, wherein transmitting the content targeting rules to the on-board content controller on the airplane comprises:
    determining an amount of time before takeoff;
    determining a version of the content to transmit to the IFE system prior to takeoff based on the amount of time; and
    transmitting the content targeting rules and the version of the content to the IFE system prior to takeoff.

14. The method of claim 13, wherein retrieving the information associated with the passenger comprises:
    determining a future flight of an airplane; and
    receiving a passenger manifest for the future flight, the passenger manifest indicating the passenger is scheduled to be on the future flight.

15. The method of claim 14, wherein determining the content targeting rules comprises:
    retrieving historical impression data for the passenger, the historical impression data indicating content viewed by the passenger during a previous flight; and
    determining the content targeting rules based on the historical impression data.

16. The method of claim 15, further comprising:
    receiving, after landing, an impression count indicating a portion of the content that was viewed by the passenger; and
    updating the historical impression data based on the impression count.

17. The method of claim 13, wherein determining the content targeting rules comprises:
    determining at least one of a passenger record, flight schedule, or journey information associated with the passenger; and
    determining the content targeting rules based on the at least one of the passenger record, flight schedule, or journey information.

18. The method of claim 17, wherein the passenger record comprises at least one of a name, address, gender, age, and special need, and wherein the journey information comprises at least one of a city pair and time of day.

19. The method of claim 13, further comprising:
    receiving targeted requests for the content that indicate an audience desired by the owner of the content; and
    determining the content targeting rules to satisfy a condition that the content meets the targeted requests.

20. The method of claim 13, wherein retrieving information associated with a passenger of the airplane comprises:
    providing the passenger with a survey comprising questions related to content preferences of the passenger;
    receiving, in response to providing the survey, feedback from the passenger indicating the content preferences of the passenger; and
    determining the content targeting rules based on the content preferences.

21. The method of claim 13, wherein transmitting the content targeting rules to the on-board content controller on the airplane comprises:
    determining whether to use a cyclic content delivery network or an acyclic content delivery network based on the amount of time and a size of the content; and
    transmitting the content targeting rules and the content to the on-board content controller on the airplane.

22. The method of claim 13, wherein determining the content targeting rules comprises:
    determining the content to be made available, the content including at least one of a movie, a TV show, audio, and an in-flight buying opportunity; and
    determining a trigger for causing the content to be pushed to the passenger during the flight, the trigger being based on historical usage data of the passenger and in-flight context and the trigger being determined without input from the passenger, the in-flight context comprising the action by the passenger, which is separate from an amount of time spent viewing the content and an amount of time relative to a duration of the flight.

23. The method of claim 13, wherein determining the content targeting rules comprises:
    determining instructions for modifying what is included in the content being made available to the passenger on the airplane based on in-flight updates of content consumption by the passenger.

* * * * *